United States Patent [19]

Malik

[11] 4,293,681
[45] Oct. 6, 1981

[54] LIQUID ANHYDRIDE BLENDS

[75] Inventor: Edward P. Malik, Tonawanda, N.Y.

[73] Assignee: Buffalo Color Corporation, West Paterson, N.J.

[21] Appl. No.: 123,269

[22] Filed: Feb. 21, 1980

[51] Int. Cl.³ .............................................. C08G 59/42
[52] U.S. Cl. ................................... 528/115; 528/365; 252/182
[58] Field of Search ................. 528/115, 365; 252/182

[56] References Cited

U.S. PATENT DOCUMENTS 2,978,435 4/1961 Pfeffingen ............................ 528/115
3,245,916 4/1966 Woskow .......................... 528/115 X
3,247,125 4/1966 Woskow .......................... 528/115 X
3,296,202 1/1967 Schmitz-Josten et al. ..... 528/115 X

OTHER PUBLICATIONS

Bruins, *Epoxy Resin Technology*, Interscience, N.Y., 1968, pp. 71≠72.

*Primary Examiner*—Earl A. Nielsen

[57] ABSTRACT

An anhydride blend of from 7 to 25 weight percent methyl endomethylenetetrahydrophathalic anhydride and from 75 to 93 weight percent hexahydrophthalic anhydride which is liquid at room temperature and imparts excellent properties to epoxy resins cured with the blend including unexpectedly high impact strength.

6 Claims, No Drawings

LIQUID ANHYDRIDE BLENDS

BACKGROUND OF THE INVENTION

1. Field of the Invention

This invention relates to acid anhydrides and more particularly relates to those acid anhydrides which are suitable for use as an epoxy hardener or curing agent for resins.

2. History of the Prior Art

Anhydrides find many commercial uses. One of the major uses for anhydrides, especially certain anhydrides, is as curing agents or hardeners for epoxy resins. Many of the curing agents or hardeners for epoxy resins are acid anhydrides. Among the most widely used anhydrides for curing agents are methyltetrahydrophthalic acid anhydride (MeTHPAA). MeTHPAA is a relatively inexpensive anhydride formed by reaction of maleic anhydride with isoprene and is a liquid when isomerized to the one isomer, i.e., the isomer wherein the anhydride carbons and the double bond are attached to the same carbon atoms on the ring. MeTHPAA, however, has some disadvantages. In particular, the heat deflection temperature and impact strength of epoxy products cured with MeTHPAA are not as high as desireable. Of the low cost liquid anhydrides, MeTHPAA is the only anhydride having a viscosity below 100 cps.

Methylhexahydrophthalic acid anhydride (MeHHPAA) is another liquid anhydride which has a low viscosity but is a high cost anhydride which sometimes has stability problems. Hexahydrophthalic acid anhydride (HHPAA) is sometimes used instead of MeTHPAA as an epoxy curing agent. Unfortunately, HHPAA is a solid instead of a liquid at room temperature thus requiring that the HHPAA be melted and used at elevated temperatures. Interestingly, HHPAA can also be prepared as a low viscosity liquid product when an expensive palladium catalyst is used. Unfortunately, the liquid isomer reverts to a solid isomer upon heating. Furthermore, the HHPAA anhydride picks up water upon exposure to air. For these reasons, a commercial liquid HHPAA has been unacceptable and impractical. Solid HHPAA, nevertheless, continues to be used because it imparts good properties to cured epoxy resin, e.g., good color, good electrical characteristics, good strength and good heat resistance, even though liquid anhydrides such as MeTHPAA, methyl endomethylenetetrahydrophthalic anhydride (MEA), dodecenylsuccinic acid anhydride (DDSAA) and methylhexahydrophthalic acid anhydride (MeHHPAA) are available. Methyl endomethylenetetrahydrophthalic anhydride, also known as methyl-5-norbornene-2,3-dicarboxylic anhydride is available from Buffalo Color Corporation under the trademark Nadic ® Methyl Anhydride. The impact strength of epoxy resin cured with HHPAA is not, however, as high as desired. MEA has a viscosity at 25° C. of about 200 cps and DDSAA has a viscosity at 25° C. of about 290 cps.

BRIEF DESCRIPTION OF THE INVENTION

In accordance with the present invention, there is provided an anhydride curing agent which is liquid at room temperature, i.e., liquid down to at least 25° C. and as low as −14° C. and has a viscosity below about 100 cps. The anhydride curing agent of the invention, nevertheless, retains most advantages of solid hexahydrophthalic anhydride, i.e., good strength, good color and good electrical properties. In addition, the curing agent of the invention imparts better impact strength to cured epoxy resins than any prior art anhydride curing agent. The curing agent is a blend of from 7 to 25 and preferably from about 15 to about 25 weight percent methyl endomethylenetetrahydrophthalic anhydride and from about 75 to 93 and preferably from about 75 to about 85 weight percent of hexahydropthalic anhydride.

The invention further includes the improved process for curing epoxy resins by using the anhydride blends of the invention as the epoxy curing agent in a quantity of from about 0.8 to about 1 mole and preferably from about 0.85 to 1 mole per epoxide equivalent in the resin.

The invention also comprises epoxy resins cured with the curing agent of the invention in accordance with the process of the invention.

DETAILED DESCRIPTION OF THE INVENTION

The liquid blend of the invention, as previously mentioned, contains from 7 to 25 weight percent of methyl endomethylenetetrahydrophthalic anhydride and from 75 to 93 weight percent hexahydrophthalic anhydride. When over 25 percent of methyl endomethylenetetrahydrophthalic anhydride is used, the properties contributed by the methyl endomethylenetetrahydrophthalic anhydride become significant thus reducing overall performance of the blend as an epoxy curing agent. When less than 7 percent methyl endomethylenetetrahydrophthalic anhydride is used, the solidification temperature is greater than 25° C. which means that the blend would be solid at room temperature. Desirably, the blend contains from about 15 to 25 weight percent methyl endomethylenetetrahydrophthalic anhydride so that the solidification temperature is between −14° and +5° C. In order to further reduce any adverse effects which methyl endomethylenetetrahydrophthalic anhydride may have upon the blend, it is even more desirable that the blend contain from about 15 to about 20 weight percent of the methyl endomethylenetetrahydrophthalic anhydride. Within this range of methyl endomethylenetetrahydrophthalic anhydride, the solidification temperature is between about −5° C. and +5° C. which permits the blend to remain liquid at room temperature and at most storage and transportation temperatures. Although the HHPAA is a solid at 25° C. (settling point 35° C.) and the MEA has a viscosity of about 200 cps at 25° C., the viscosity of the blend surprisingly is below 100 centipoise. Such a low viscosity of the blend is entirely unexpected in view of the solid and high viscosity characteristics of the components of the blend. The low viscosity improves ease of handling and processing. As methyl endomethylenetetrahydrophthalic anhydride concentration in the blend increases past 25 weight percent, the viscosity also seems to increase dramatically.

A further even more surprising result is that resin cured with the blend has an impact strength substantially greater than resin cured with either blend component individually, better than resin cured with HHPAA and better than resin cured with any other liquid anhydride.

If desired, the blend may be stabilized such as disclosed in U.S. Pat. Nos. 3,580,857 and 3,580,858.

The blend is suitable for curing any epoxy resin which is curable with an anhydride curing agent. The term "epoxy resin" may or may not be a polymeric material which includes any material containing two or more reactive oxirane groups. The class of epoxy resins most commonly cured using anhydrides are the diglycidyl ethers of bisphenol A.

The improved process in accordance with the present invention comprises utilizing the previously described anhydride curing agent blend to cure epoxy resins. In the process from about 0.8 to about 1 mole and preferably from about 0.85 to 1 mole of the liquid anhydride curing agent per epoxide equivalent in the resin, is blended with the resin and the blend of curing agent and resin is cured for a suitable time and at a suitable temperature to form hardened epoxy resin. Suitable times may range from 2 to 24 hours and suitable temperatures may range from 90° to 200° C. In addition, varying times and temperatures may be used throughout the cure cycle. The invention further includes the epoxy resin hardened in accordance with the foregoing process.

It is to be understood that other additives can be incorporated into the blend of epoxy resin and curing agent. Such additives can include fillers in a quantity of from 10 to 70 weight percent by total weight of blend. The filler may be any conventional filler material such as silica, calcium carbonate, calcium silicate, aluminum oxide, glass fibers, clay or talc. Especially preferred are filled compositions wherein the filler is predominately silica.

Frequently, when the epoxy is used as a molding compound, mold release agents, i.e., lubricants, are generally included in the epoxy-anhydride blend in accordance with the present invention. Exemplary lubricants are carnauba wax; montanic acid ester wax; polyethylene wax; polytetrafluoroethylene wax; glycerol monostearate; calcium, zinc and other metallic stearates; paraffin waxes and the like. Flame retardants may also be added to the epoxy-anhydride blend as well as colorants and in some cases, coupling agents. An initiating catalyst is almost always employed in an amount of from about 0.02 to 5 percent. Exemplary of such catalysts are basic and acidic catalysts such as the metal halide Lewis acids, e.g., boron trifluoride, stannic chloride, zinc chloride and the like; metal carboxylic salts such as stannous octoate and the like; and amines, e.g. alpha-methylbenzyldimethylamine, dimethylethylamine, dimethylaminomethylphenol, 2,4,6-tris (dimethylaminomethyl) phenol, triethylamine, and imidazole derivatives and the like.

In forming the blends, the methyl endomethylenetetrahydrophthalic anhydride and hexahydropthalic acid anhydride can be readily mixed by any suitable mixing equipment. When the blend of methyl endomethylenetetrahydrophthalic anhydride and hexahydropthalic anhydride is in turn blended with the epoxy resin, frequently more specialized equipment such as ball mills or differential roll mills are used especially when undissolved solids such as fillers are present.

The following examples serve to illustrate but not limit the liquid anhydride blend of the present invention, the process for using the blend to cure an epoxy resin and the resulting cured resin. Unless other wise indicated, all parts and percentages are by weight.

EXAMPLE 1

2 grams of benzyldimethylamine catalyst is mixed with 100 grams of Shell Epon$^R$ 828 epoxy resin which is a diglycidyl ether of bisphenol A having an epoxy equivalent weight of 185 to 192 and a viscosity at 25° C. of 100 to 160 poise. Sufficient methyl endomethylenetetrahydrophthalic anhydride (MEA) is then mixed with the resin to give 0.85 moles of anhydride per epoxy equivalent. The resulting epoxy-anhydride blend is then cured for two hours at 90° C., three hours at 165° C. and 16 hours at 200° C. The resin is cast in the shape of bars having a thickness of about 1/16" which bars are suitable for testing tensile strength. The resulting cured epoxy resin has an average tensile strength of about 9,279 psi.

EXAMPLE 2

Example 1 is repeated except hexahydropthalic anhydride (HHPAA) is used and sufficient anhydride is added to provide 1 mole of curing agent per epoxy equivalent. The resulting bar has an average tensile strength of 11,576 psi.

EXAMPLE 3

Example 1 is repeated except methyltetrahydrophthalic anhydride (MeTHPAA) is substituted for methyl endomethylenetetrahydrophthalic anhydride. The resulting bar has an average tensile strength of 10,286 psi.

EXAMPLE 4

Example 1 is repeated except in place of MEA, 0.85 moles of dodecenylsuccinic acid anhydride (DDSAA) is used per epoxy equivalent. The results are shown in Table I.

EXAMPLE 5

Example 1 is repeated except an 80 weight percent HHPAA, 20 weight percent MeTHPAA blend is substituted for MEA at a molar ratio of 1 mole of blend per epoxy equivalent. The results are shown in Table I.

EXAMPLE 6

Example 1 is repeated except that a liquid blend of 80 weight percent of hexahydropthalic acid anhydride and 20 percent methyl endomethylenetetrahydrophthalic anhydride is substituted for the nadic methyl anhydride of Example 1 and 1 mole of anhydride curing agent is used per epoxy equivalent. The resulting bar has an average tensile strength of 10,171 psi.

Of the liquid anhydrides tested, only one (the 80-20 HHPAA-MeTHPAA blend) resulted in a significantly higher tensile strength in the cured resin than the 80 weight percent hexahydropthalic acid anhydride-20 weight percent methyl endomethylenetetrahydrophthalic anhydride blend of the invention. When the solid hexahydropthalic acid anhydride is used, it is necessary to heat the anhydride prior to incorporating it into the epoxy resin.

When similar compositions are prepared in the form of buttons suitable for testing of heat deflection temperature, it is found that use of the 80 weight percent of hexahydropthalic acid anhydride-20 weight percent methyl endomethylenetetrahydrophthalic anhydride blend results in heat deflection temperatures comparable to the heat deflection temperature obtained when solid hexahydropthalic acid annhydride is used and results in a heat deflection temperature which is exceeded by only one other tested liquid anhydride. (MEA)

Measurement of the surface resistivity of any of the epoxy resins cured with anhydrides shows that the resistivity of all resulting cured epoxies are exceedingly high and that the 80 weight percent hexahydropthalic acid anhydride-20 weight percent methyl endomethylenetetrahydrophthalic anhydride is as high or higher than all other anhydride cured epoxy resins tested.

A testing of the cured epoxy resins for Izod impact strength shows that the impact strength of the epoxy resin cured with the 80 weight percent hexahydropthalic acid anhydride-20 weight percent methyl endomethylenetetrahydrophthalic anhydride is on the average greater than impact strengths of epoxies cured with any other liquid anhydride and in fact appears to be greater than the average impact strength of an epoxy resin cured with unblended solid hexahydropthalic acid anhydride. Furthermore, with the exception of epoxy resin cured with methyl endomethylenetetrahydrophthalic anhydride, the hardness of epoxy resin cured with 80 weight percent hexahydropthalic acid anhydride and 20 weight percent methyl endomethylenetetrahydrophthalic anhydride is greater than the hardness of epoxy resins cured with any other liquid anhydride and in fact is harder than an epoxy resin cured with unblended hexahydropthalic acid anhydride.

For convenience, the summary of comparative properties has been set forth in Table I.

The liquid anhydride blend has excellent overall properties for use as a curing agent for epoxy resins and results in better impact strength than any other liquid anhydride tested including solid HHPAA. The blend very unexpectedly has better impact strength than either of its components. The blend of the invention also very unexpectedly has greater fluidity at 25° C. than either blend component.

with from 75 to 93 weight percent hexahydrophthalic anhydride.

2. The blend of claim 1 wherein the blend contains from about 15 to 25 weight percent methyl endomethylenetetrahydrophthalic anhydride and from 75 to about 85 weight percent of hexahydrophthalic anhydride.

3. An improved process for curing an epoxy resin wherein the improvement comprises utilizing as the curing agent from about 0.8 to about 1 mole of a liquid blend of anhydrides per epoxide equivalent in the resin, said blend comprising from about 7 to about 25 percent by weight of blend of methyl endomethylenetetrahydrophthalic anhydride and from 75 to 93 percent by weight of blend of hexahydrophthalic anhydride.

4. An improved process for curing an epoxy resin wherein the improvement comprises utilizing as the curing agent from about 0.85 to about 1 mole of a liquid blend of anhydrides per epoxide equivalent in the resin, said blend comprising from about 15 to about 25 percent by weight of blend of methyl endomethylenetetrahydrophthalic anhydride and from 75 to 85 percent by weight of blend of hexahydrophthalic anhydride.

5. An epoxy resin hardened with from about 0.8 to about 1 mole of a liquid blend of anhydrides per epoxide equivalent in the uncured resin, said blend comprising from 7 to 25 weight percent methyl endomethylenetetrahydrophthalic anhydride with from 75 to 93 weight percent hexahydrophthalic anhydride.

6. The resin of claim 5 wherein from about 0.85 to 1 mole of blend is used per epoxide equivalent in the

TABLE I

| Curing Agent | Mol Ratio Curing Agent/Epoxy Eq. (1) | Liquid/ Solid (1) | Color of Anhydride | Average Tensile Strength (1) | Surface Resistivity $10^{15}$ ohms (1) | 264psi Heat Deflection (1) | Izod Impact Ft-Lbs Average (1) | Barcol Hardness (1) |
|---|---|---|---|---|---|---|---|---|
| HHPAA | 1.00 | Solid | Clear | 11,576psi | 5.9 | 259° F. | 2.1 | 36 |
| MEA | 0.85 | Liquid | Yellow | 9279psi | 6.9 | 300° F. | 2.1 | 40 |
| 80% HHPAA 20% NMA | 1.00 | Liquid | Very Slightly Yellow | 10,171psi | 20.0 | 259° F. | 2.7 | 37 |
| MeTHPAA | 0.85 | Liquid | Yellow | 10,286psi | 20.0 | 249° F. | 2.4 | 34 |
| DDSAA | 0.85 | Liquid | Yellow | 6,261psi | 7.9 | 157° F. | 1.3 | 20 |
| 80% HHPAA 20% MeTHPAA | 1.00 | Liquid | Slightly Yellow | 12,034psi | 7.9 | 258° F. | 1.9 | 35 |

(1) 2 parts benzyldimethylamine catalyst- 2 hr. 90° C., 3 hr. 165° C., 16 hr. 200° C. cure cycle

What is claimed is:

1. A liquid blend of from 7 to 25 weight percent methyl endomethylenetetrahydrophthalic anhydride uncured resin and the blend comprises from about 15 to about 25 weight percent methyl endomethylenetetrahydrophthalic anhydride and from about 75 to 85 weight percent hexahydrophthalic anhydride.

* * * * *